United States Patent Office 3,285,902
Patented Nov. 15, 1966

3,285,902
EMULSIFIABLE WAXES AND THEIR PRODUCTION
Karl Schmeidl, Frankenthal, Pfalz, Germany, assignor to Badische Anilin- & Soda-Fabrik Aktiengesellschaft, Ludwigshafen (Rhine), Germany
No Drawing. Filed Jan. 29, 1963, Ser. No. 254,608
Claims priority, application Germany, Feb. 6, 1962, B 65,820
6 Claims. (Cl. 260—94.9)

This invention relates to new, high-grade, easily emulsifiable and readily soluble waxes and to a process for their production by oxidation of thermally degraded high molecular weight polyolefines which is very advantageous technically and is also economical.

Waxy products are prepared on a large scale by degradation of high molecular weight polyolefines and these products have different properties depending on the initial materials and the method of degradation and accordingly are used for many different purposes.

Thermally decomposed polyethylene is a hydrocarbon which is very hydrophobic and therefore not suitable for applications in which a certain affinity for water is desired, for example as in the case of waxes which must be emulsifiable in water for the production of dry-bright wax emulsions.

Hydrophilic waxes, i.e. emulsifiable waxes, are obtainable by oxidation of hydrocarbon waxes or by oxidative degradation of high molecular weight polyolefines.

Oxidation of thermally degraded polyolefines, which for technical and economic reasons is usually carried out in a melt, is accompanied by a very undesirable concomitant: As oxidation proceeds, the melt viscosity of the reaction product increases with simultaneous discoloration. Highly viscous waxes however cannot be emulsified or can only be emulsified with difficulty; thus the property which it is desired to secure is the very property which is impaired by the oxidation process.

Increase in viscosity can be avoided, as may be seen from French patent specification No. 1,252,635, but only by observing a number of precautions, including the maintenance of a mild reaction temperature, the exclusion of unsuitable oxidation catalysts and control of the amount of oxygen introduced. Maintenance of a low reaction temperature in particular is a considerable burden in a commercial process because long reaction periods must be used.

In the oxidation of thermally degraded polyolefines by the prior art processes there is however always the risk that nevertheless the melt viscosity will be increased or even that a gel will form, and any deviation from strictly prescribed reaction conditions will lead to worsening of the product; furthermore it is not possible to exceed a degree of oxidation which corresponds to the acid number of the product.

The acid number is the number of milligrams of potassium hydroxide required to neutralize 1 gram of test substance under specified conditions.

It is the object of this invention to provide high-grade readily emulsifiable waxes having lower melt viscosity than the initial material and having acid numbers between 4 and 80. It is another object of the invention to provide an economical process for the production of such waxes from thermally degraded polyolefines by oxidation.

I have found that the said and other objects are achieved when at least a portion of the carbon-carbon double linkage present in the thermally degraded polyolefines, which for the most part have been formed by the degradation, is saturated by hydrogenation prior to the oxidation.

Thermally degraded polyolefines, for example polypropylene, polybutylene and particularly high pressure and low pressure polyethylene having molecular weights between 1000 and 15,000, preferably between 3000 and 10,000, are suitable as initial materials. These polymers have average melt viscosities (measured at 120° C.) of 200 centistokes at molecular weight 1000, of 1000 centistokes at molecular weight 5000 and of 2000 centistokes and above at molecular weight 15,000.

The bromine number is a measure of the number of double linkages in degraded polyolefines of the type mentioned. The bromine number is the number of grams of iodine which will react with 100 grams of test substance under specified conditions. Depending on the manufacture and origin of the initial material, the bromine number will vary between the values 0.5 and 15; for thermally degraded polyethylene having a molecular weight of about 5000, the bromine number is usually between 3 and 7. According to the process of this invention, the polyolefines should be hydrogenated as completely as possible (bromine number equal to zero), but for many purposes it is sufficient for hydrogenation to be carried so far that the bromine number of the hydrogenated product is not more than 1.

The thermally degraded polyolefines may be hydrogenated by the conventional methods, preferably in a melt of the polyolefine with gaseous hydrogen under superatmospheric pressure in the presence of a hydrogenation catalyst. If the hydrogenation is carried out at about 200° C., all the double linkages are usually saturated after 1 to 3 hours. It is particularly advantageous to carry out the hydrogenation continuously using a fixed bed of catalyst which is resistant to attrition. Compressed nickel-diatomaceous earth catalysts having a nickel content of about 20% are for example suitable for the purpose. Wax hydrogenated continuously in this way does not contain any catalyst. The polyolefin may also be hydrogenated during the thermal degradation by following the method described in British patent specification 728,551.

Oxidation of the hydrogenated polyolefines may be carried out by all oxidation processes without any special precautions. Air, oxygen and chromosulfuric acid are examples of suitable oxidizing agents; catalysts such as heavy metal salts may be present if desired. Oxidation may be carried out in solution or in a melt at temperatures between 100° C. and 200° C. at atmospheric or superatmospheric pressure.

Although the oxidation is not limited to any particular procedure, oxidation with air in a polyolefine melt at temperatures between 140° and 170° at atmospheric pressure without a catalyst is preferred. To shorten the reaction period it is sometimes advantageous to provide for vigorous mixing during the process.

Depending on the properties which it is desired that the finished wax should have, the hydrogenated polyolefine may be oxidized to any technically useful degree, i.e. up to an acid number of 80. There is no risk that the melt viscosity will be increased. On the contrary the melt viscosity is always considerably decreased during the oxidation. The oxidation should be carried to a point where the melt viscosity of the oxidized product, measured at 120° C., is at least below 1000 centistokes and preferably below 500 centistokes. Products having acid numbers between 4 and 10 are particularly suitable as emulsifiable waxes for floor polish and those having acid numbers between 40 and 80 as lubricants which are compatible with water. A particular advantage of the waxes according to this invention is that in contrast to comparable prior art waxes they do not become more viscous or even gelatinous upon strong and prolonged thermal stress. Experience has shown that the viscosity of these waxes remains unchanged during thermal stress at 150° C. for twenty-four hours.

The process according to this invention results in emulsifiable waxes of the highest quality.

The following example illustrates the principle of the invention for a large number of embodiments falling within the scope of the invention.

*Example*

50 kg. of high pressure polyethylene having the molecular weight 5500, a melt viscosity of about 1000 centistokes (measured at 120° C.) and the bromine number 3, which has been obtained by thermal degradation of a high polymer in the usual way, is hydrogenated in the presence of 1.2 kg. of a nickel-diatomaceous earth catalyst at 200° C. in the course of three hours at 200 atmospheres hydrogen pressure. The catalyst is then separated. A wax having the bromine number zero is obtained.

This product is placed in a reactor provided with a reflux condenser and a water separator, and oxygen is passed in at a temperature of 160° C. while stirring. Reaction sets in after about ten minutes. About 1500 liters of oxygen per hour is passed in. The oxidation is stopped after a reaction period of two hours. An emulsifiable, practically colorless wax is obtained having the acid number 9.6 and the melt viscosity 550 centistokes (measured at 120° C.).

If the oxidation is continued for five hours, a wax is obtained having the acid number 40.6 and the melt viscosity 450 centistokes (measured at 120° C.).

If the material is not hydrogenated prior to the oxidation, the product is a yellow brown highly viscous composition having acid numbers of 8.4 and 21 and melt viscosities of 1200 and 2780 centistokes after an oxidation period of 2 and 5 hours.

A high grade wax is obtained in the same way from thermally degraded low pressure polyethylene by hydrogenation and subsequent oxidation; if the hydrogenation is omitted, a marked increase in the melt viscosity and a consequent decline in emulsifiability is observed during oxidation.

I claim:

1. A process for the production of waxes emulsifiable in aqueous media by the oxidation of thermally degraded polyolefines which comprises: hydrogenating said thermally degraded polyolefines to saturate a sufficient number of double bonds of said material to produce a product having a bromine number of not more than one, and thereafter oxidizing said hydrogenated polyolefines until the product has an acid number between 4 and 80.

2. A process for the production of waxes emulsifiable in aqueous media by oxidation of thermally degraded polyolefines having a molecular weight between 1000 and 15,000 which comprises: hydrogenating said thermally degraded polyolefines to saturate a sufficient number of double bonds of said material to produce a product having a bromine number of not more than one, and thereafter oxidizing said hydrogenated polyolefins until the product has an acid number between 4 and 80.

3. A process for the production of waxes emulsifiable in aqueous media by oxidation of thermally degraded polyolefines having a molecular weight between 3000 and 10,000 which comprises: hydrogenating said thermally degraded polyolefines to saturate a sufficient number of double bonds of said material to produce a product having a bromine number of not more than one, and thereafter oxidizing said hydrogenated polyolefines until the product has an acid number between 4 and 80.

4. A process for the production of waxes emulsifiable in aqueous media by oxidation of thermally degraded polyethylene having a molecular weight between 3000 and 10,000 which comprises: hydrogenating said thermally degraded polyolefines to saturate a sufficient number of double bonds of said material to produce a product having a bromine number of not more than one, and thereafter oxidizing said hydrogenated polyolefines until the product has an acid number between 4 and 80.

5. A process for the production of waxes emulsifiable in aqueous media by oxidation of thermally degraded polypropylene having a molecular weight of between 3000 and 10,000 which comprises: hydrogenating said thermally degraded polyolefines to saturate a sufficient number of double bonds of said material to produce a product having a bromine number of not more than one, and thereafter oxidizing said hydrogenated polyolefines until the product has an acid number between 4 and 80.

6. A process for the production of waxes emulsifiable in aqueous media by oxidation of thermally degraded polyolefines which comprises: hydrogenating said thermally degraded polyolefines with a fixed bed catalyst to saturate a sufficient number of double bonds of said material to produce a product having a bromine number of not more than one, and thereafter oxidizing said hydrogenated polyolefines until the product has an acid number between 4 and 80.

References Cited by the Examiner

UNITED STATES PATENTS

| | | | |
|---|---|---|---|
| 2,372,001 | 3/1945 | Joyce | 260—94.9 |
| 2,828,296 | 3/1958 | Guillet | 260—94.9 |
| 3,060,163 | 10/1962 | Erchak | 260—94.9 |

FOREIGN PATENTS

| | | |
|---|---|---|
| 728,551 | 4/1955 | Great Britain. |
| 1,252,635 | 12/1960 | France. |

JOSEPH L. SCHOFER, *Primary Examiner.*

LEON ZITVER, *Examiner.*

B. HELFIN, L. EDELMAN, *Assistant Examiners.*